Dec. 28, 1965  R. B. BEERS  3,226,533
RADIX N ADDITION-SUBTRACTION TEACHING DEVICE
Filed Sept. 12, 1963  2 Sheets-Sheet 1

INVENTOR.
RANSOM B. BEERS
BY McLaughlin & Cahill
ATTORNEYS

Dec. 28, 1965    R. B. BEERS    3,226,533
RADIX N ADDITION-SUBTRACTION TEACHING DEVICE
Filed Sept. 12, 1963    2 Sheets-Sheet 2

INVENTOR.
RANSOM B. BEERS
BY McLaughlin & Cahill
ATTORNEYS

United States Patent Office 3,226,533
Patented Dec. 28, 1965

1

3,226,533
RADIX n ADDITION-SUBTRACTION TEACHING
DEVICE
Ransom B. Beers, R.R. 1, Sidell, Ill.
Filed Sept. 12, 1963, Ser. No. 308,463
4 Claims. (Cl. 235—169)

The present invention pertains to teaching machines, and more specifically, a machine for teaching students addition and subtraction of signed numbers in various number systems. This application is a continuation-in-part of my co-pending application Serial No. 203,381 filed June 18, 1962, now abandoned.

Many students have difficulty upon encountering for the first time, the addition and subtraction of signed numbers. It is often very difficult to teach these students the fundamental properties of signed numbers and the effect of these properties when the numbers are added or subtracted. It is also difficult to teach students the addition and subtraction of signed numbers when the number base, or radix, is not the commonly used radix ten. With the advent of modern technology and the utilization of other number systems such as, for example, the binary number system, it becomes increasingly important that a thorough understanding be acquired of the operation of subtraction and addition of signed numbers in all number systems. For the student having difficulty visualizing the subtraction of one negative number from another for example, the visualization of the same operation in a binary or ternary number system becomes almost impossible. Prior art teaching machines have attempted to overcome these difficulties by a variety of means; however, in each case the particular prior art teaching device has overlooked one key fact in the psychology of student learning. That fact is the correlation between what the student does to the machine and the results that the machine presents to the student. For example, many teaching devices utilize accumulating machinery wherein a running total of the entries is kept and the results of successive additions and subtractions is presented to the student sequentially as the entries are made. A beginning student, using one of these prior art devices, is more often than not mystified at the mechanism of the teaching device and does not, or cannot, associate the manipulation of the keyboard of the teaching device with the results presented by the device. This dissociation of the manipulation of the teaching device with the actual mathematical theory renders the teaching device ineffective and inefficient. It is necessary that the student be presented with an immediate, and meaningful, impression of what is happening, in terms of mathematics, when he manipulates the machine so that his thought processes follow the logical implications of the mathematics involved and so that he does not become overly concerned with the "magic" of the machine with which he is working.

It is therefore an object of the present invention to provide a simple and effective teaching machine for teaching the addition and subtraction of signed numbers in various radices.

It is another object of the present invention to provide a teaching machine that is readily portable and therefore can be utilized at a student's desk without concern about electrical outlets.

It is still another object of the present invention to provide a teaching machine that can readily be used to present the addition and subtraction of signed numbers in any of several selected radices.

It is still another object of the present invention to provide a teaching machine that may be used by more advanced students of mathematics as an exercise machine for the manipulation of signed numbers in various radices.

2

Further objects of the present invention will become apparent to those skilled in the art as the description thereof procedes.

Briefly, in accordance with one embodiment of the present invention, a teaching machine is provided having two groups of switches each representing a linear series of signed numbers. Each switch of a linear series is representative of a number to a chosen radix and sign. The simultaneous depression of one switch in each of the two rows of switches completes an electric circuit to energize an indicator in a row of indicators each of which represents a signed number of a linear series of signed numbers. A separate switch is provdied for choosing the operation to be performed: add or subtract. The row of indicators and each row of switches are provided with rotatable drums adjacent thereto having a field for each switch or indicator. Each field includes an indicia representing the value of the associated switch or indicator to an appropriate radix. The drums may be rotated to present different fields to thereby indicate the value of the associated switch or indicator in a variety of number systems.

The electrical circuitry is provided including a first group of switches each representing one of a linear series of signed numbers and connected, when manually closed, to a plurality of switches each one of said plurality of switches being one switch of a ganged switch. The plurality of ganged switches are part of a second group of manually operable switches each representing one of a second linear series of signed numbers. When one of the second group of switches is depressed, all of the switches ganged therewith are closed, and an electrical circuit is completed through the first switch depressed, through the ganged switch closed by the depression of the second switch, to an indicator device which, in the embodiment chosen for illustration, takes the form of a neon lamp. Interposed between the first and second groups of switches is a third group of single-pole, double-throw switches which are ganged and each of which are connected in series with one of the first group of switches. This third group of switches alter the interconnection between the first and second group of switches to permit a change in the combinatorial relationship between the switch groups to thus provide for the difference in the operations of add and subtract.

A more detailed description will now be given of my invention with the aid of the accompanying drawings in which.

Figure 1:
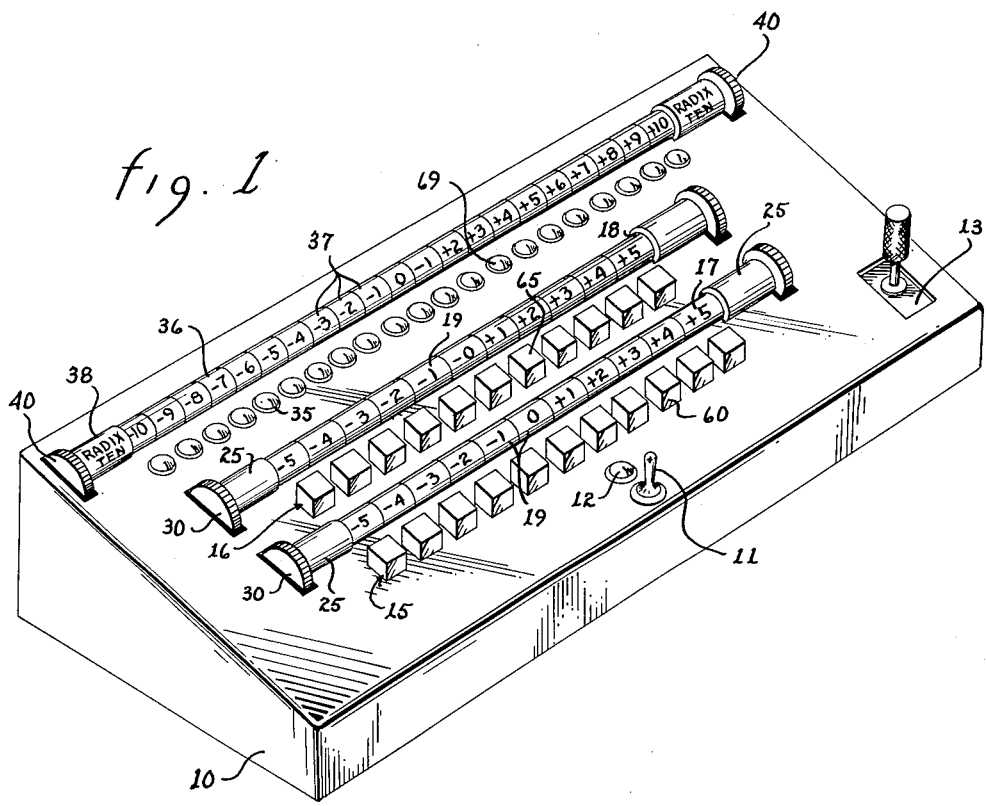
FIG. 1 is an isometric view of a teaching machine constructed in accordance with the teachings of the present invention.

Referring to FIG. 1, my teaching machine includes a housing 10 of a conveniently portable size that may be placed on a conventional school desk. A three position on-off switch 11 is provided with an accompanying neon indicator 12 to permit the system to be connected to a conventional wall outlet or to a battery contained within the housing. An add-subtract switch 13 is provided to enable the student to select the operation of add or subtract. A first row of switches 15 is provided each of which represents a signed number of a linear series of numbers. For purposes of illustration, eleven switches have been chosen and are shown in FIG. 1 as representing the decimal numbers minus five to plus five. A second row of switches 16 is shown each of which represents similar signed numbers of a linear series of numbers. Each row of switches 15 and 16 are provided with associated rotatable cylindrical drums 17 and 18 respectively each of which include a plurality of fields 19. Each of these fields corresponds to one of the switches in each of the rows of switches 15 and 16. The drums are rotatably mounted in the housing 10 and include a space 25 at each end thereof for receiving indicia to inform the student of the radix in which the numbers in the respective fields are presented. An enlarged, and knurled, hub 39 is provided at each end of the drums to permit manual rotation thereof. It will be obvious to those skilled in the art that any convenient manner may be utilized to mount the drums in the housing 10; it will also be obvious that many schemes may be utilized for positioning the fields of each drum and possibly for locking the drum against rotation to prevent inadvertent presentation to the student of an improper radix system.

A plurality of indicator lights 35 are provided each representing a signed number of a linear series of signed numbers. The indicator lights 35 represent the result of the operation performed by depressing one switch in each of the rows of switches 15 and 16. The value of each indicator 35 is presented by a third rotatable cylindrical drum 36 which is divided into fields 37 in a manner similar to the rotatable drums 17 and 18. Further, the rotatable drum 36 is provided with a portion 38 which, in the embodiment chosen for illustration, indicates that the numbers in the fields of the drum are in the radix ten. The drum is also provided with knurled hubs 40 at each end thereof for rotation by the student to thereby select the appropriate radix.

Figure 2:
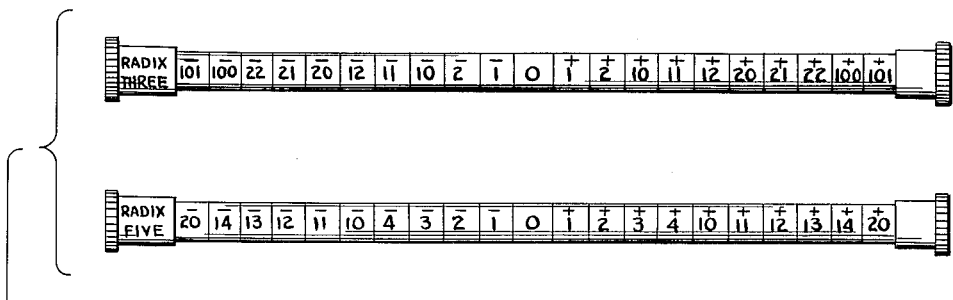
FIG. 2 is a drawing showing various positions of the cylindrical drums included in the device of FIG. 1.

The radix ten was chosen for illustration in FIG. 1; as indicated in connection with FIG. 1 each of the drums is rotatable to present a different radix in the respective fields thereof to thereby indicate that the associated switch or indicator represents a number in the chosen radix. For example, referring to FIG. 2, the drum 36 of FIG. 1 is shown rotated to present a radix three and a radix five. Thus, the student may readily determine that if the result of a computation by depressing a switch in rows 15 and 16 is a —8 in decimal terms, the same result is a —22 in a radix three or a —13 in a radix five.

Figure 3:
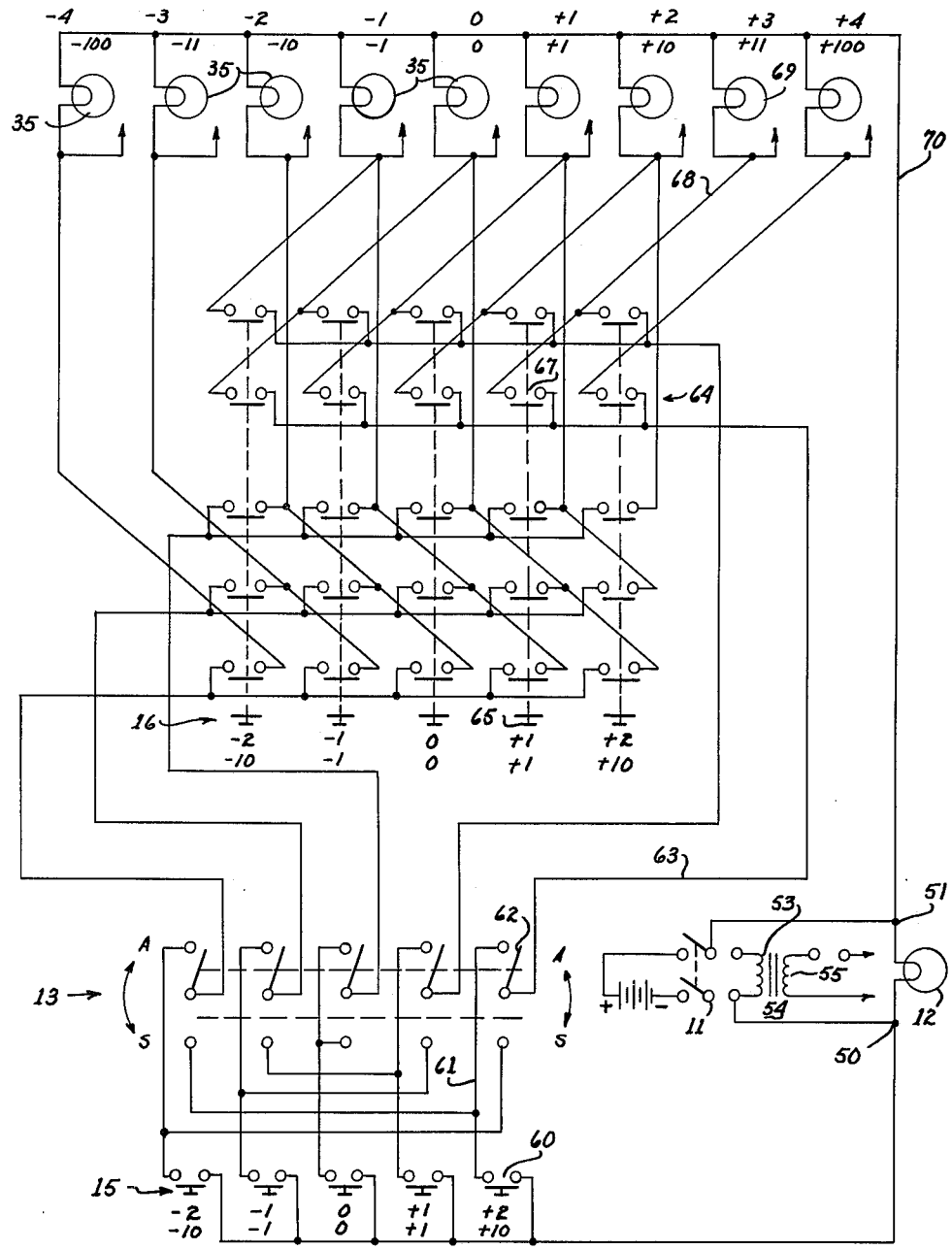
FIG. 3 is a schematic circuit diagram of the circuitry of the teaching machine of the present invention.

The circuit of FIG. 3 is shown for a teaching machine having switches 15 for $n$ signed numbers, and switches 16 for $n$ signed numbers. For purposes of description, the circuit of FIG. 3 has been limited to a linear series of signed numbers wherein $n$ equals five. The indicators 35 shown in FIG. 3 are thus sufficient to provide an indication of the sum or difference of any combination of the $n$ switches 15 and $n$ switches 16, or a total number of indicators equal to $2n-1$. The teaching machine of FIG. 1 is illustrated having groups of switches 15 and 16 wherein the linear series extends from a —5 to a +5. The circuit of FIG. 3 may readily be expanded to accommodate the necessary switches as shown in FIG. 1, and it will also be obvious to those skilled in the art that both FIG. 1 and FIG. 3 may be expanded to accommodate any desired number of switches to represent a linear series of signed numbers of any length.

Referring to FIG. 3, the row of switches 15 is shown connected to the on-off switch 11. The switch 11 in FIG. 3 is shown as a three position switch the first position of which connects terminals 50 and 51 across a D.C. source of potential such as a battery, the second position of which is the position shown in FIG. 3—open circuit or off; and the third position of which connects terminals 50 and 51 to the secondary winding 53 of a transformer 54, the primary winding 55 of which may be connected to any suitable source of A.C. power (not shown). Therefore, the teaching machine of the present invention may be operated by portable battery power or by connection to a conventional wall outlet. The switch 11, being a three position switch, enables the connection of the system to the battery or to a wall outlet through a transformer. When the switch 11 is in the battery or A.C. positions, the voltage presented across terminals 50 and 51 will cause neon lamp 12 to illuminate thereby indicating that power is supplied to the system.

The indicators 35 each have one side thereof connected to the terminal 51. The second row of switches 16 comprise a row of ganged switches each of the single-pole, single-throw variety. Thus, the depression of one switch in row 16 of FIG. 1 actually closes five single-pole, single-throw switches each of which is ganged to simultaneously open and close. The switches 15 and 16 are mechanically biased to the open circuit position, the biasing means being a conventional and convenient spring or an electro-magnetic force exerting device (not shown). Each switch in the row of switches 16 has one of the ganged switches thereof energized by the closure of one of the switches 15. Thus, the particular switch of the ganged plurality of switches provided by the switches 16 is selected by the depression of an appropriate switch 15. The ganged switches each have one terminal thereof connected to one of the indicator lamps 35. The add-subtract switch 13 is a ganged plurality of single-pole, double-throw switches each of which is connected to two of the switches 15 and each of which has the single pole thereof connected to one of the rows of ganged switches 16. Thus, switch 13 is placed in series between switches 15 and 16 and determines the electrical connection derivable by the depression of a selected switch in the group of switches 15 and 16. For example, assuming switch 13 is in the upward or add position to close the contact between the single pole and the upper contact of each of the mechanically ganged switches of the switch 13, and assuming that switch 60 of the group 15 was closed, an electrical potential would be applied from terminal 50 through the switch 60 through conductor 61, switch 62, conductor 63 to the row of switches 64. The switches 64 comprise a row of switches each of which is mechanically ganged to one of the group of switches 16. Thus, an electrical potential has been applied to one terminal of each of the row of switches 64. If the switch 65 of the group of switches 16 is now depressed, each of the switches mechanically ganged thereto, including switch 67, will be closed. Since one terminal of switch 67 has already been energized through conductor 63, a completed electrical circuit will have been provided through the switch 67, conductor 68, indicator 69, and conductor 70, to terminal 51.

The operation of the teaching machine of the present invention may be described as follows. Assuming the student is to perform the operations of addition and subtraction in a number system having radix two, the rotatable drums 17, 18 and 36 are rotated until "radix two" appears at the end portion thereof. The numerical value represented by each of the switches 15 and 16 are thereby indicated in the binary number system and the results of addition or subtraction are indicated by the indicator lamps 35 in the appropriate number system. Assuming that a positive two is to be added to a positive one in a binary number system, the operator will depress switch 60 and switch 65 while switch 13 is in the add position. Switch 60, as indicated in FIG. 1, corresponds to a positive two, or in the binary system, 10; similarly, switch 65 corresponds to positive one, or in the binary number system 01. The potential existing across terminals 50 and 51 of FIG. 3 are thus applied to the circuit of FIG. 3 and provide current through the completed electrical circuit including switches 60, 62, conductor 63, switch 67, conductor 68, indicator 69, and conductor 70. The indicator 69 will indicate a positive three, or in binary terminology 11. The immediacy of the result upon depressing one of the switches in the groups of switches 15 and 16 provides the student with an instant indication of the proper sum or difference. A very dramatic demonstration may be provided the student by holding one of the switches 15 in the depressed position while successively depressing each of the switches 16. The student is then visually presented with the results of adding a negative number of decreasing absolute value and ultimately the addition of increasing absolute values of positive numbers. This visualization become particularly helpful when more complex problems are presented to the student such as, for example, the subtraction of a negative number from another negative number all numbers having a radix five. Even for older students who are accomplished in various aspects of mathematics frequently find it difficult to think in terms of numbers having a radix other than ten. The teaching machine described above is a substantial aid to such students to gain familiarity and facility with a variety of number systems. To further enhance a student's ability to manipulate numbers in various systems, it is possible to add a signed number having one radix to a signed number having a different radix with the result indicated in still another radix. Alternatively, the rotatable drums 17, 18 and 36 may mechanically be secured together to prevent independent rotation and to insure that the indicia in the respective fields thereof are always in the same radix.

It will be obvious to those skilled in the art that many modifications may be made in the present invention without departing from the spirit and scope thereof; accordingly, the scope of the present invention is defined only by the claims appended hereto.

I claim:

1. An educational device for indicating the sum and difference of two signed numbers when circuits representing said numbers are simultaneously energized comprising: a first group of switches each representing one of a linear series of signed numbers; a second group of switches each representing one of a linear series of signed numbers and each comprising a ganged plurality of switches; means connecting each switch of said first group of switches to a corresponding series of switches, each said corresponding series of switches comprising one switch from each ganged plurality of switches; a group of indicators each representing one of a linear series of signed numbers; means connecting each switch and each ganged plurality of switches to one of said indicators; and a group of electric power connected to said first group of switches and to said group of indicators for completing an electrical circuit when one of said first group and one of said second group of switches are simultaneously closed.

2. An educational device for indicating the sum and difference of two signed numbers when circuits representing said numbers are simultaneously energized comprising: a first group of $n$ switches each representing one of a series of signed numbers; a second group of $n$ switches each representing one of a linear series of signed numbers and each comprising a ganged plurality of $n$ switches; means connecting each switch of said first group of $n$ switches to a corresponding series of switches, each said corresponding series of switches comprising one switch from each ganged plurality of $n$ switches; a group of $2n+1$ indicators each representing one of a linear series of signed numbers; means connecting each ganged plurality of $n$ switches to one of said $2n+1$ indicators; and a source of electric power connected to said first group of switches and to said group of indicators for completing an electrical circuit when one of said first group and one of said second group of switches are simultaneously closed.

3. An educational device for indicating the sum and difference of two signed numbers when circuits representing said numbers are simultaneously energized comprising: a first group of $n$ switches each representing one of a linear series of signed numbers and each comprising a single-pole, single-throw switch; a second group of $n$ switches each representing one of a linear series of signed numbers and each comprising a ganged plurality of $n$ single-pole, single-throw switches; means connecting each single-pole, single-throw switch of said first group of switches to a corresponding series of switches, each said corresponding series of switches comprising one single-pole, single-throw switch from each ganged plurality of switches; a group of $2n+1$ indicators each representing one of a linear series of signed numbers; means connecting each single-pole, single-throw switch and each ganged plurality of switches to a different one of said indicators; and a source of electrical power connected to said first group of switches and to said group of indicators for completing an electrical circuit when one of said first group and one of said second group of switches are simultaneously closed.

4. An educational device for indicating the sum and difference of two signed numbers when circuits representing said numbers are simultaneously energized comprising: a first group of switches each representing one of a linear series of signed numbers; a second group of switches each representing one of a linear series of signed numbers and each comprising a ganged plurality of switches; means connecting each switch of said first group of switches to a corresponding series of switches, each said corresponding series of switches comprising one switch from each ganged plurality of switches; a group of indicators each representing one of a linear series of signed numbers; means connecting each switch and ganged plurality of switches to one of said indicators; a source of electric power connected to said first group of switches and to said group of indicators for completing an electrical circuit when one of said first group and one of said second group of switches are simultaneously closed; and a plurality of radix markers positioned adjacent said first and second groups of switches and adjacent said group of indicators for representing the numerical value, in the appropriate number system, of said switches and indicators, said radix markers being divided into a plurality of fields, each field adjacent a different one of said switches and indicators, each field having therein an indication of the value in a given radix of the switch or indicator adjacent to which the field is positioned.

References Cited by the Examiner
UNITED STATES PATENTS

| | | | |
|---|---|---|---|
| 521,360 | 6/1894 | Bechmann | 35—77 X |
| 2,364,540 | 12/1944 | Luhn | 235—169 |
| 2,512,837 | 6/1950 | Pescatori | 35—31.3 |

ROBERT C. BAILEY, *Primary Examiner.*

LAWRENCE CHARLES, *Examiner.*

W. GRIEB, T. M. ZIMMER, *Assistant Examiners.*